United States Patent
De Silvio

(10) Patent No.: US 7,424,328 B2
(45) Date of Patent: Sep. 9, 2008

(54) APPARATUS AND METHOD FOR WIRELESS PROCESS CONTROL

(76) Inventor: Louis F. De Silvio, 17707 N. 129th East Ave., Collinsville, OK (US) 74021

( * ) Notice: Subject to any disclaimer, the term of this patent is extended or adjusted under 35 U.S.C. 154(b) by 244 days.

(21) Appl. No.: 11/327,828

(22) Filed: Jan. 3, 2006

(65) Prior Publication Data
US 2007/0156253 A1   Jul. 5, 2007

(51) Int. Cl.
G05B 11/01 (2006.01)
G05B 19/42 (2006.01)
G06F 9/45 (2006.01)

(52) U.S. Cl. .......................... 700/18; 700/86; 717/136
(58) Field of Classification Search .............. 700/18, 700/23, 65, 86, 87, 89, 181; 717/136, 140
See application file for complete search history.

(56) References Cited

U.S. PATENT DOCUMENTS

| | | | |
|---|---|---|---|
| 4,937,777 A * | 6/1990 | Flood et al. ................ 710/107 |
| 5,714,931 A | 2/1998 | Petite et al. |
| 5,812,394 A * | 9/1998 | Lewis et al. ................... 700/17 |
| 5,926,103 A | 7/1999 | Petite |
| 5,926,531 A | 7/1999 | Petite |
| 6,028,522 A | 2/2000 | Petite |
| 6,028,857 A | 2/2000 | Poor |
| 6,167,319 A * | 12/2000 | Harris et al. ................... 700/86 |
| 6,218,953 B1 | 4/2001 | Petite |
| 6,233,327 B1 | 5/2001 | Petite |
| 6,256,334 B1 | 7/2001 | Adachi |
| 6,373,399 B1 | 4/2002 | Johnson et al. |
| 6,418,324 B1 | 7/2002 | Doviak et al. |
| 6,430,268 B1 | 8/2002 | Petite |
| 6,437,692 B1 | 8/2002 | Petite et al. |
| 6,618,578 B1 | 9/2003 | Petite |
| 6,628,764 B1 | 9/2003 | Petite |
| 6,628,992 B2 * | 9/2003 | Osburn, III ................... 700/9 |
| 6,671,586 B2 | 12/2003 | Davis et al. |
| 6,747,557 B1 | 6/2004 | Petite et al. |
| 6,784,807 B2 | 8/2004 | Petite et al. |
| 6,799,195 B1 | 9/2004 | Thibault et al. |
| 6,836,737 B2 | 12/2004 | Petite et al. |
| 6,862,498 B2 | 3/2005 | Davis et al. |
| 6,862,553 B2 * | 3/2005 | Schwenke et al. ........... 702/183 |

(Continued)

OTHER PUBLICATIONS

"Wireless Controller Module with RF Transceiver", Version 1, Orbit Communications: Wireless Solutions that Work, www.orbitcoms.com, 8 pages.

(Continued)

Primary Examiner—Thomas K Pham
(74) Attorney, Agent, or Firm—David M. Doyle

(57) ABSTRACT

An apparatus includes a programmable logic controller capable of receiving input data from and/or providing output data to at least one device in a process control system. The programmable logic controller is also capable of executing compiled code. The apparatus also includes a memory capable of storing source code corresponding to the compiled code. In addition, the apparatus includes a processor capable of storing the source code in the memory. The apparatus may further include a wireless radio capable of communicating over a wireless network. In particular embodiments, the programmable logic controller and the processor may form a single functional unit. In other embodiments, the processor and memory may operate in place of the programmable logic controller.

23 Claims, 12 Drawing Sheets

U.S. PATENT DOCUMENTS

| | | | |
|---|---|---|---|
| 6,865,509 B1 | 3/2005 | Hsiung et al. | |
| 6,891,838 B1 | 5/2005 | Petite et al. | |
| 6,914,533 B2 | 7/2005 | Petite | |
| 6,914,893 B2 | 7/2005 | Petite | |
| 6,950,851 B2 * | 9/2005 | Osburn, III | 709/203 |
| 6,963,817 B2 | 11/2005 | Ito et al. | |
| 7,019,667 B2 | 3/2006 | Petite et al. | |
| 7,053,767 B2 | 5/2006 | Petite et al. | |
| 7,079,810 B2 | 7/2006 | Petite et al. | |
| 7,103,511 B2 | 9/2006 | Petite | |
| 7,123,933 B2 | 10/2006 | Poor et al. | |
| 7,137,550 B1 | 11/2006 | Petite | |
| 7,184,861 B2 | 2/2007 | Petite | |
| 7,203,931 B2 * | 4/2007 | Minamide et al. | 717/136 |
| 7,209,840 B2 | 4/2007 | Petite et al. | |
| 7,225,037 B2 * | 5/2007 | Shani | 700/18 |
| 7,263,073 B2 | 8/2007 | Petite et al. | |
| 7,295,128 B2 | 11/2007 | Petite | |
| 7,299,099 B1 | 11/2007 | Divelbiss et al. | |
| 2001/0002210 A1 | 5/2001 | Petite | |
| 2002/0027504 A1 | 3/2002 | Davis et al. | |
| 2002/0031101 A1 | 3/2002 | Petite et al. | |
| 2002/0120921 A1 * | 8/2002 | Coburn et al. | 717/140 |
| 2003/0036810 A1 | 2/2003 | Petite | |
| 2005/0195768 A1 | 9/2005 | Petite et al. | |
| 2005/0195775 A1 | 9/2005 | Petite et al. | |
| 2005/0226794 A1 | 10/2005 | Hodge et al. | |
| 2005/0240545 A1 | 10/2005 | Schachtely et al. | |
| 2005/0243867 A1 | 11/2005 | Petite | |

OTHER PUBLICATIONS

"AdaletWireless", www.adaletwireless.com.
Phoenix Contact, www.phoenixcontact.com.

* cited by examiner

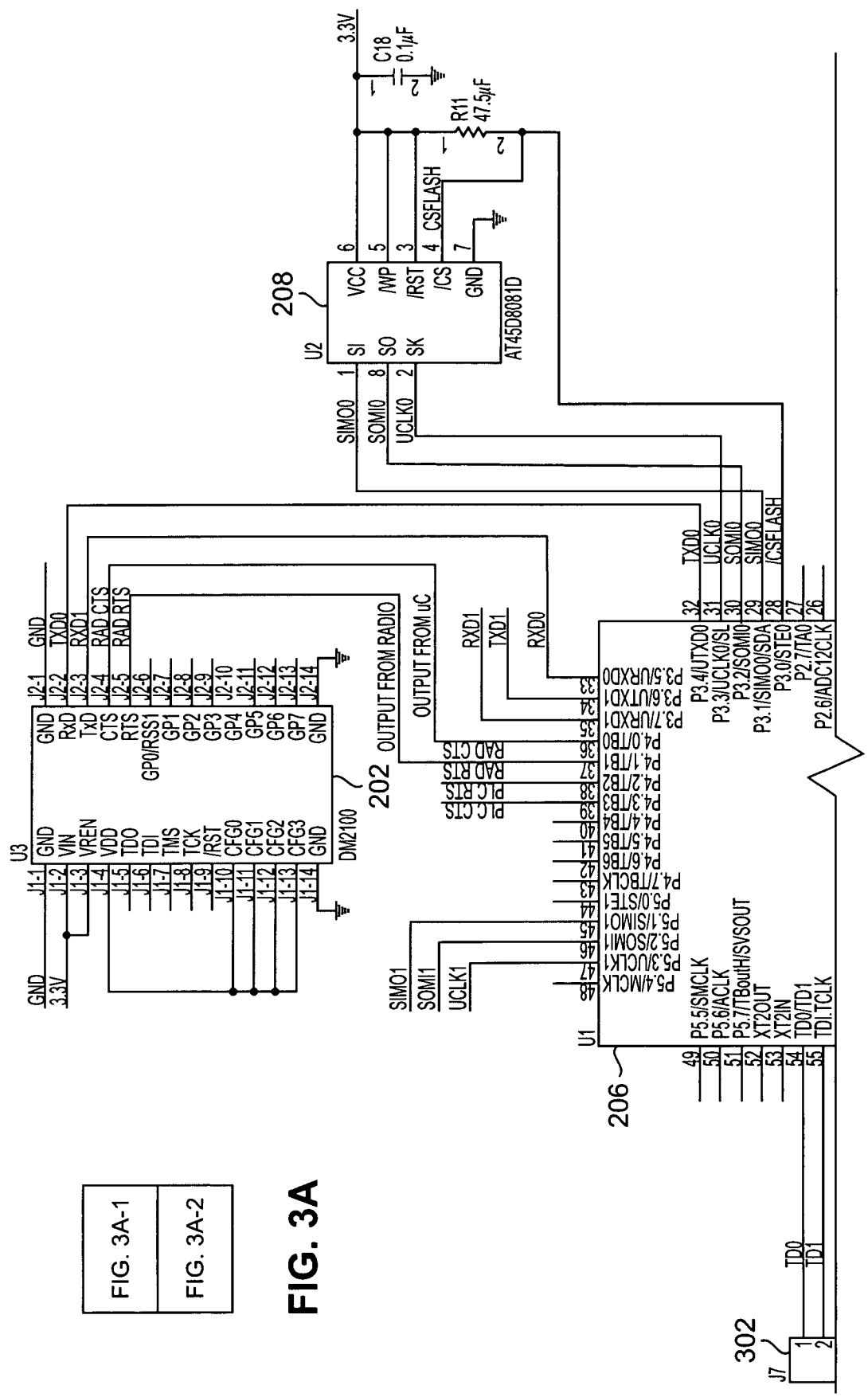

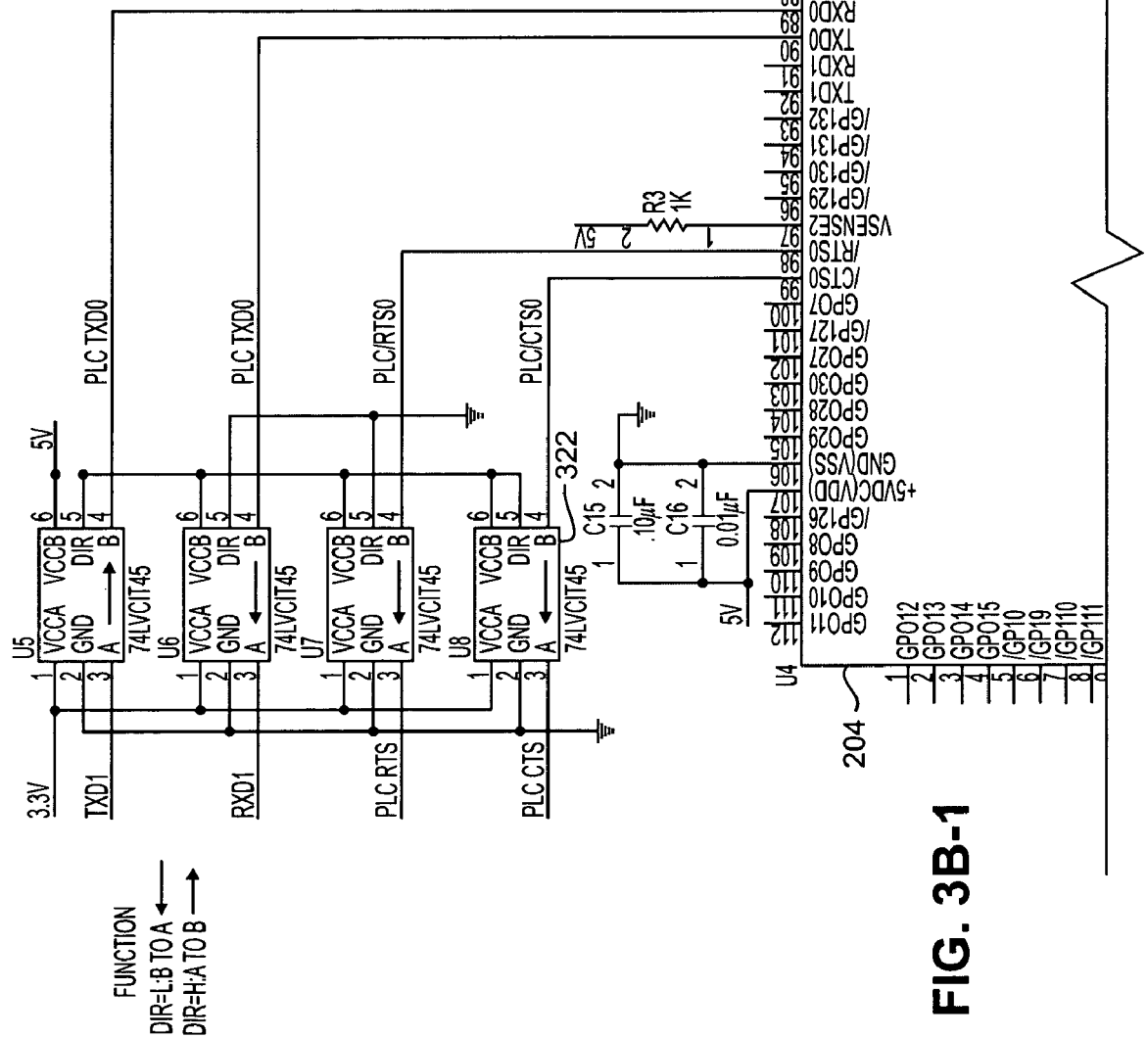

APPARATUS AND METHOD FOR WIRELESS PROCESS CONTROL

TECHNICAL FIELD

This disclosure relates generally to process control systems and more specifically to an apparatus and method for wireless process control.

BACKGROUND

System Control And Data Acquisition or "SCADA" systems are routinely used in processing facilities to monitor and control the operation of processing equipment in the facilities. Monitoring devices in a conventional SCADA system typically monitor and collect information associated with different characteristics of a processing facility. The collected information is then made available to control devices, which use the information to determine how to control processing equipment in the facility.

A conventional monitoring device in a SCADA system may be polled to gather information collected by that device, and/or the monitoring device may report its collected information upon the occurrence of a specified event, or it may provide information on a continuous or periodic basis. If being polled, the monitoring device typically stores its information in registers that lie dormant until the information is retrieved by a control device. When an emergency or other "alarm" condition occurs, the monitoring device typically sends its data to a control device immediately and does not wait to be polled.

In a conventional SCADA system, monitoring devices typically represent devices that are physically wired to control devices in the SCADA system. Also, all or most of the processing in a conventional SCADA system is centralized and is performed by the control devices in the SCADA system, although some localized functions may be performed solely by devices such as programmable logic controllers (PLCs) with or without SCADA involvement.

SUMMARY

This disclosure provides an apparatus and method for wireless process control.

In a first embodiment, an apparatus includes a programmable logic controller capable of receiving input data from and/or providing output data to at least one device in a process control system. The programmable logic controller is also capable of executing compiled code. The apparatus also includes a memory capable of storing source code corresponding to the compiled code. In addition, the apparatus includes a processor capable of storing the source code in the memory.

In particular embodiments, the programmable logic controller and the processor form a single functional unit.

In a second embodiment, a method includes executing compiled code at a programmable logic controller. The programmable logic controller forms part of or is coupled to a first controller in a process control system. The method also includes storing source code corresponding to the compiled code in a memory of the first controller. In addition, the method includes wirelessly communicating with a second controller over a wireless network. The controllers are capable of controlling at least one device in the process control system.

In a third embodiment, a system includes a plurality of devices capable of measuring one or more characteristics in the system, initiating one or more physical actions in the system, and/or performing one or more physical actions in the system. The system also includes a plurality of controllers coupled to the plurality of devices. Each of at least one of the controllers includes a programmable logic controller capable of receiving input data from and/or providing output data to at least one of the devices. The programmable logic controller is also capable of executing compiled code. Each of at least one of the controllers also includes a memory capable of storing source code corresponding to the compiled code. Each of at least one of the controllers further includes a processor capable of storing the source code in the memory. In addition, each of at least one of the controllers includes a wireless radio capable of communicating with at least one other of the controllers over a wireless network.

In a fourth embodiment, an apparatus includes a processor capable of receiving input data from and/or providing output data to at least one device in a process control system. The processor is also capable of executing compiled code. The apparatus also includes a memory capable of storing source code corresponding to the compiled code. The processor is further capable of storing the source code in the memory.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
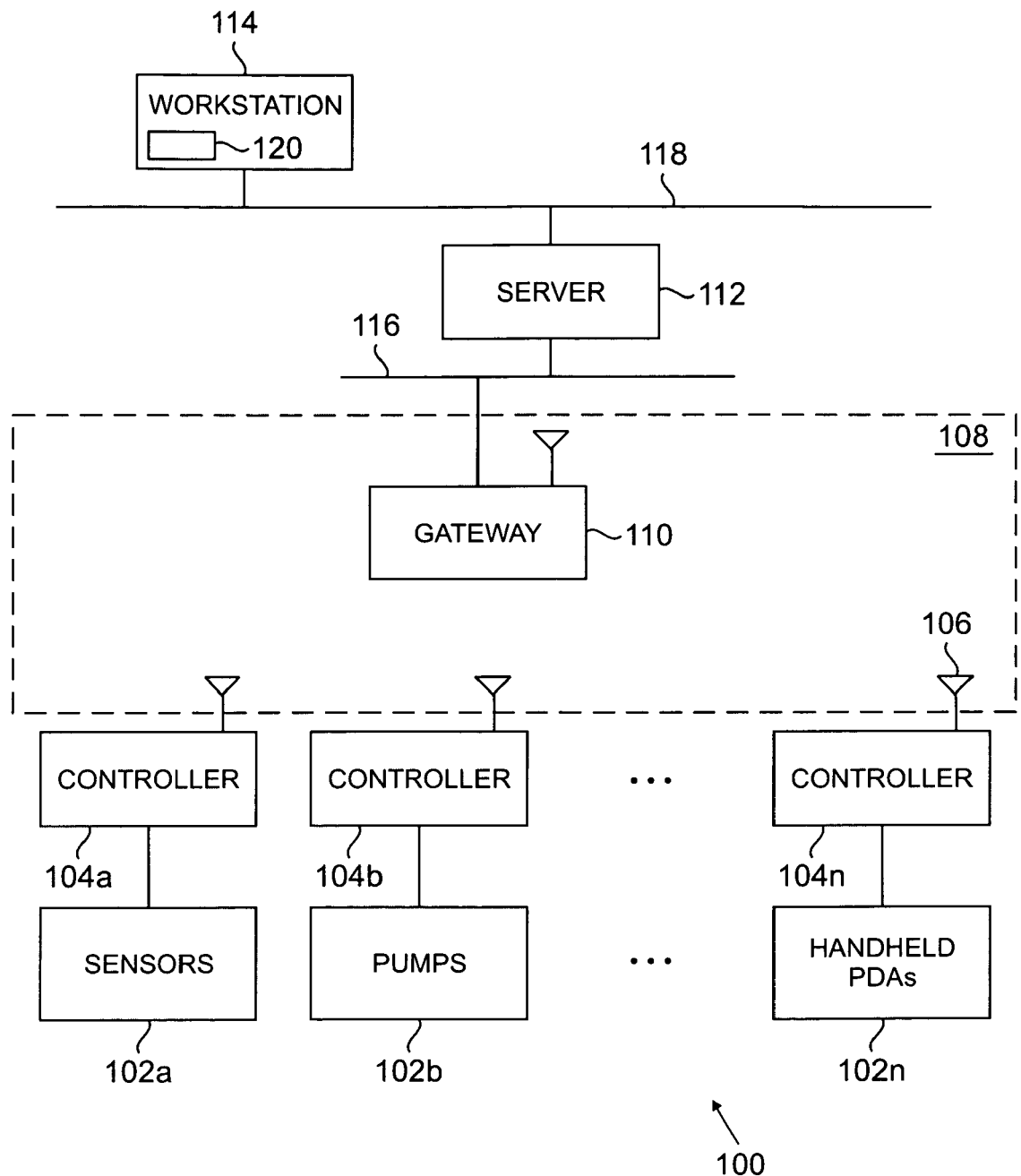
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

A "process control system" generally refers to a system that controls the output of a particular process, such as a manufacturing or production process. In this example, the process control system 100 includes various devices 102a-102n. The devices 102a-102n represent processing equipment or other devices that are monitored, controlled, or otherwise used in the process control system 100. For instance, the devices 102a-102n could include sensors for sensing conditions or measuring characteristics, actuators for initiating actions, and processing elements for performing actions in the system 100.

In this embodiment, the devices 102a-102n include sensors, which measure various characteristics of the process control system 100. For example, the sensors could include pressure sensors capable of measuring pressure inside pipelines. The devices 102a-102n also include pumps, such as pumps that pump fluid through the pipelines (resulting in the pressure measured by the sensors). In addition, the devices 102a-102n include handheld personal digital assistants, which are portable devices used to capture data from various points in the system 100. These represent examples of the types of devices 102a-102n that could be used in the process control system 100. The process control system 100 could include any other or additional devices.

Figure 2:
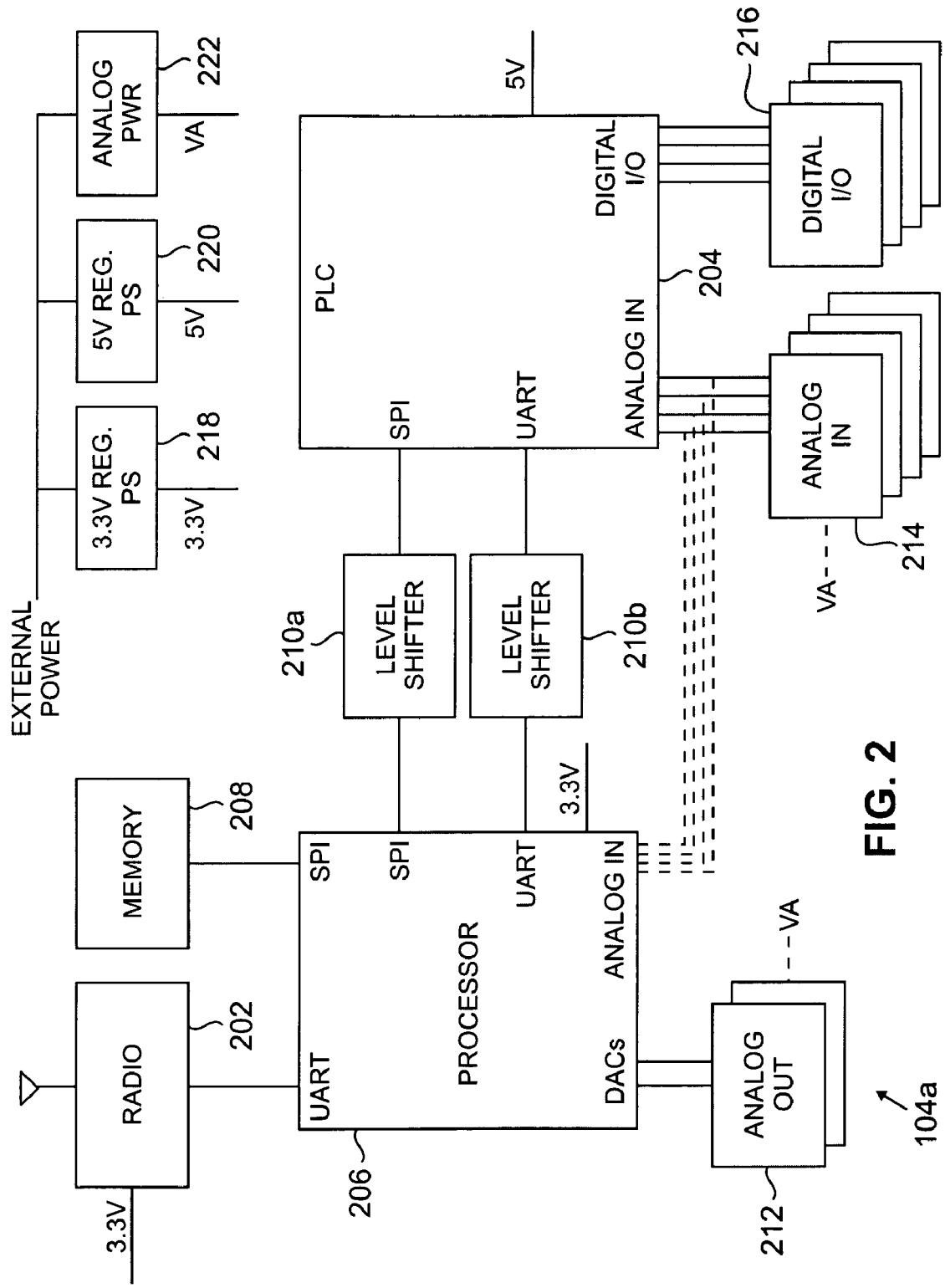
FIG. 2 illustrates an example wireless controller in a process control system according to one embodiment of this disclosure.

As shown in FIG. 1, the devices 102a-102n are coupled to or communicate with controllers 104a-104n, respectively. The controllers 104a-104n control the operation of or otherwise supervise the operation of the devices 102a-102n. For example, the controllers 104a-104n could receive measurements from the sensors and generate signals to control the operation of the pumps. The controllers 104a-104n could perform any other or additional control activities to control the devices 102a-102n. Each of the controllers 104a-104n includes any suitable structure or structures for facilitating control of the devices 102a-102n. One example embodiment of the controllers 104a-104n is shown in FIG. 2, which is described below.

Each of the controllers 104a-104n is coupled to an antenna 106. The antennas 106 allow the controllers 104a-104n to wirelessly communicate with one another or with other components in the process control system 100 over a wireless network 108. In some embodiments, the controllers 104a-104n interact with one another directly to collectively control the devices 102a-102n. In other embodiments, the controllers 104a-104n interact with one another indirectly through a gateway 110 or other device. In yet other embodiments, the controllers 104a-104n interact with a SCADA or other control system, which includes a server 112 and a workstation 114. Each of the antennas 106 represents any suitable structure or structures for supporting wireless communications, such as a radio frequency (RF) or other antenna.

The network 108 represents any suitable wireless network facilitating communication between at least the controllers 104a-104n. The network 108 could, for example, represent a wireless mesh network. The network 108 could also represent a "wi-fi" network having one or more base stations. The network 108 could represent any other suitable wireless network facilitating wireless communications. Also, the network 108 could support any type of communications, such as point-to-point, point-to-multipoint, and multipoint-to-multipoint communications.

The gateway 110 represents a gateway to a control system, such as a legacy or other SCADA system. For example, the gateway 110 may receive information from the controllers 104a-104n and pass the information to the SCADA system. The gateway 110 could also receive information from the SCADA system and transmit the information wirelessly to one or more of the controllers 104a-104n. The gateway 110 represents any suitable structure for facilitating communication between the controllers 104a-104n and a SCADA or other control system.

As noted above, the SCADA system in this example includes the server 112 and the workstation 114. The server 112 represents a computing or other device for performing various functions, such as logging or storing historical data collected from the controllers 104a-104n (where the information represents the operation of the process control system 100). The server 112 could also execute applications for altering the operation of the controllers 104a-104n or the devices 102a-102n. The server 112 could, for example, represent a server or other computer executing a WINDOWS NT or other WINDOWS operating system from MICROSOFT CORPORATION. The workstation 114 represents a computing or other device used by a user to access the server 112. The workstation 114 could, for example, represent a desktop or laptop computer executing a WINDOWS NT, WINDOWS 95, WINDOWS 3.1, or other WINDOWS operating system from MICROSOFT CORPORATION. The server 112 and the workstation 114 could support any suitable protocol(s), such as the MODBUS, PROFIBUS, FIELDBUS, or DeviceNet protocol. In this embodiment, the gateway 110, server 112, and workstation 114 are coupled via various networks 116-118. Each of the networks 116-118 represents any suitable wireline or wireless communication network or combination of networks, such as an Ethernet network.

In some embodiments, the controllers 104a-104n implement a distributed control scheme in the process control system 100, where the controllers 104a-104n interact with one another to control the devices 102a-102n. In particular embodiments, the controllers 104a-104n represent stand-alone components that may or may not be used in conjunction with a SCADA system. Also, the controllers 104a-104n could interact with one another through the gateway 110, and the server 112 and the workstation 114 may or may not be omitted from the process control system 100. In addition, the server 112 and/or the workstation 114 could represent a stand-alone component that may or may not used in any type of legacy or other SCADA system.

In one aspect of operation, each of the controllers 104a-104n includes a processor coupled to a memory, and each of the controllers 104a-104n may include or be coupled to a programmable logic controller (PLC). The PLCs implement the functions used to control the devices 102a-102n. In some embodiments, the PLC in or coupled to each of the controllers 104a-104n executes compiled code, and the source code corresponding to the compiled code is stored in the memory of that controller. In this way, the system 100 supports, for example, remote access to the source code for any PLC. Also, the system 100 supports polling or identification of the code being executed by any PLC in the system 100.

In a second aspect of operation, the system 100 includes an input/output (I/O) mapping application 120, such as an application executed by the server 112 or workstation 114. The I/O mapping application 120 is used to control associations between input and output ports of the controllers 104a-104n. For example, the I/O mapping application 120 may allow a user to identify each I/O port in a controller, describe the I/O port's type and function, describe the type of device attached to the I/O port (such as using a drag and drop mechanism or a drop-down mechanism), and map an input port in one controller to an output port in another controller. The I/O mapping application 120 may also allow the user to view how the ports are mapped in the process control system 100, such as by presenting a graphical user interface identifying how input ports are mapped to output ports in different controllers. The I/O mapping application 120 may further allow the user to change the mappings between the input and output ports to support particular control functionality in the process control system 100.

In a third aspect of operation, each of the controllers 104a-104n includes a wireless radio supporting communication via the network 108. In some embodiments, the wireless radios support peer-to-peer, multipoint-to-multipoint communications between the controllers 104a-104n. In these embodiments, each of the controllers 104a-104n functions as a transmitter and a receiver so that the controller may both transmit information to other controllers and receive information from other controllers in the process control system 100. Each of the controllers 104a-104n also functions as a repeater, allowing the controller to receive information from other controllers and rebroadcast or retransmit the information for delivery to the appropriate destination.

Although FIG. 1 illustrates one example of a process control system 100, various changes may be made to FIG. 1. For example, the process control system 100 could include any number of devices 102a-102n, controllers 104a-104n, networks 108, gateways 110, servers 112, and workstations 114. Also, while shown as having a one-to-one association between devices 102a-102n and controllers 104a-104n, each controller could be coupled to any number and type of device(s). In addition, FIG. 1 illustrates one operational environment in which the controllers 104a-104n could be used. The controllers 104a-104n could be used in any other suitable environment or system.

FIG. 2 illustrates an example wireless controller 104a in a process control system according to one embodiment of this disclosure. The embodiment of the controller 104a shown in FIG. 2 is for illustration only. Other embodiments of the controller 104a could be used without departing from the scope of this disclosure. Also, for ease of explanation, the controller 104a is described as being used in the process control system 100 of FIG. 1, although the controller 104a could be used in any other suitable system.

In this example, the controller 104a includes a wireless radio 202. The radio 202 supports wireless communication in the network 108. For example, the radio 202 may allow the controller 104a to transmit information to and receive information from other controllers 104b-104n or the gateway 110 in the system 100. The information sent from and received by the radio 202 could represent information needed to control one or more of the devices 102a-102n in the system 100. The radio 202 includes any suitable structure for facilitating wireless communications. The radio 202 could, for example, represent a 1 mW radio or other radio. As a particular example, the radio 202 could represent a peer-to-peer, multipoint-to-multipoint mesh radio supporting the functionality described in U.S. patent application Ser. No. 11/084,991 and U.S. patent application Ser. No. 11/085,427, both filed on Mar. 21, 2005 and which are hereby incorporated by reference. Also, the radio 202 could be configured in any suitable manner, such as by using a WINDOWS or JAVA application programming interface (API) executed by the server 112 or the workstation 114.

The controller 104a also includes a programmable logic controller (PLC) 204. The PLC 204 represents a programmable controller that operates to control one or more devices 102a-102n in the system 100. For example, the PLC 204 could execute compiled code to control one or more of the devices 102a-102n. The PLC 204 represents any suitable controller capable of controlling the operation of one or more devices. The PLC 204 could, for instance, represent a PLC ON A CHIP by DIVELBISS CORPORATION, which executes compiled ladder logic code. While shown as forming part of the controller 104a itself, the PLC 204 could reside outside of and be coupled to the controller 104a.

A processor 206 is coupled to the radio 202 and the PLC 204. The processor 206 may also be coupled to a memory 208. As described in more detail below, the processor 206 supports various functions in the controller 104a. For example, the processor 206 may packetize data for communication over the network 108 and depacketize data received over the network 108. The processor 206 could also facilitate the storage and retrieval of source code (corresponding to the PLC's compiled code) in the memory 208. The processor 206 includes any suitable processor or controller, such as a MSP430F1610 microcontroller from TEXAS INSTRUMENTS INC.

The memory 208 facilitates storage and retrieval of any suitable information in the controller 104a. For example, the memory 208 could store the source code as described above. The memory 208 could also store routing tables or link maps used by the wireless radio 202 and captured by the processor 206. The memory 208 could further store mapping information, such as information mapping an input or output of the controller 104a to the input or output of another controller. The memory 208 could store any other or additional information. The memory 208 represents any suitable storage and retrieval device or devices, such as a one- or two-megabyte Flash memory.

In this example, the controller 104a further includes two level shifters 210a-210b. The level shifters 210a-210b are capable of facilitating the communication of signals between the PLC 204 and the processor 206 when the PLC 204 and the processor 206 operate using different voltage levels. For example, the level shifters 210a-210b could shift signals from the processor 206 (which may operate using 3.3V) into signals suitable for use by the PLC 204 (which may operate using 5V) and vice versa. The level shifters 210a-210b represent any suitable structures for shifting voltage levels.

As shown in FIG. 2, the controller 104a also includes various inputs and outputs for communicating with other components in the process control system 100. For example, the processor 206 is coupled to two analog outputs 212, and the PLC 204 is coupled to four analog inputs 214 and four digital inputs/outputs 216 (although as shown in FIG. 2, the analog inputs 214 could be coupled to the processor 206). The analog outputs 212 are capable of providing analog signals to components that are external to the controller 104a, such as to other controllers 104b-104n or to devices 102a-102n. The analog output signals could, for example, represent 4-20 mA signals, 0-5V signals, or 0-10V signals. The analog inputs 214 are capable of receiving analog signals from components that are external to the controller 104a. The digital inputs/outputs 216 are capable of providing or receiving digital signals to or from components that are external to the controller 104a. Each of the outputs 212, inputs 214, and inputs/outputs 216 represents any suitable structure for facilitating the communication or reception of analog or digital signals.

The controller 104a in this example further includes three regulated power supplies 218-222. The regulated power supplies 218-222 are capable of receiving an external power supply signal (such as a 12-24 VDC signal) and generating voltages required by other components of the controller 104a. In FIG. 2, the regulated power supplies 218-222 generate a 3.3V signal, a 5V signal, and a voltage (VA) used by analog components in the controller 104a. The regulated power supplies 218-222 may provide any other or additional voltages as needed by components of the controller 104a.

The radio 202, PLC 204, processor 206, and memory 208 may include any suitable interface or interfaces for communicating with one another. For example, the processor 206 may include a Universal Asynchronous Receiver/Transmitter (UART) interface to the radio 202, a serial protocol interface (SPI) to the memory 208, and UART and SPI interfaces to the PLC 204. Similarly, the PLC 204 may include UART and SPI interfaces to the processor 206. In some embodiments, the UART interfaces of the PLC 204 and the processor 206 could be used to transfer programming information (such as compiled code) to the PLC 204. The SPI interfaces could be used for I/O register access in the PLC 204. The SPI interfaces could, for instance, be used when a SCADA system interacts with the processor 206 and requests polling of data stored in I/O registers in the PLC 204. The SPI interface could also be used by the processor 206 to store appropriate data (such as data associated with analog inputs 212) in and retrieve data from the PLC's registers.

In one aspect of operation, the processor 206 provides various functions or features in the controller 104a. For example, the processor 206 may support the storage and retrieval of source code into and out of the memory 208. The source code stored in the memory 208 may correspond to the compiled code executed by the PLC 204. In this way, the source code associated with the compiled code being executed by the PLC 204 may be constantly available and easily retrievable. Also, the processor 206 could allow polling of the source code stored in the memory 208. For instance, the processor 206 could allow an external component (such as the workstation 114) to identify the version number of ladder logic source code stored in the memory 208. This may allow a user to identify the source code executing on the PLC 204 without requiring the PLC 204 to be taken out of service or otherwise interrupting the operation of the PLC 204. The processor 206 could further retrieve the source code from the memory 208 and provide the source code to an external destination, such as the I/O mapping application 120. The I/O mapping application 120 could then use the retrieved source code to identify the mappings involving the inputs and outputs of the controller 104a.

The processor 206 may also provide compiled code to the PLC 204 for storage and execution by the PLC 204. This may allow the PLC 204 to be updated more quickly, resulting in less "down time" for the PLC 204. The compiled code could be generated by the processor 206 (such as by compiling the source code stored in the memory 208), or the compiled code could be received by the controller 104a from an external source. The source code or the compiled code may be received by the processor 206 in any suitable manner. For instance, the processor 206 may receive data packets containing the source or compiled code over the network 108 via the radio 202. In some embodiments, the transmission of source or compiled code to the controller 104a may be interleaved with other transmissions in the system 100, which may help to reduce interruption of the operation of the system 100. Also, the transmission of source or compiled code to the controller 104a may occur using a high message priority, which may help to reduce interference in a mesh network 108. Error checking may be used to ensure proper delivery of the source or compiled code to the controller 104a.

The processor 206 may further packetize data for communication over the network 108 and depacketize data received over the network 108. For example, the processor 206 could receive data from an analog or digital input, place the data into a data packet, address the data packet, and transmit the data packet over the network 108 to an appropriate destination. The address of the data packet's destination may be determined using the I/O mapping, which may identify the destination for data received over a particular analog or digital input. As a particular example, the I/O mapping may identify a radio and an input or output in another controller that is associated with an input or output of the controller 104a. The processor 206 may use this mapping to properly address a data packet for the other controller.

In addition, the processor 206 may generate analog output signals, which may be provided to devices 102a-102n or other components in the system 100. This may allow, for example, the processor 206 to generate control signals for controlling one or more of the devices 102a-102n.

In some embodiments, the processor 206 could be configured to operate in different modes. For example, in a first mode (a stand-alone mode), the processor 206 could be configured to operate independent of any SCADA system. In a second mode, the processor 206 could be configured to operate independent of any SCADA system, but the processor 206 allows the SCADA system to poll the controller 104a (such as by using MODBUS) to warehouse data associated with the system 100. In a third mode, the processor 206 could be configured to operate in conjunction with a SCADA system. In the third mode, the processor 206 could allow the SCADA system to poll the controller 104a for instructions affecting devices connected to the SCADA system, and the SCADA system may take over and directly control those devices in specified circumstances.

In another aspect of operation, the I/O mapping application 120 may provide an overview of the inputs and outputs of the system 100. For example, the I/O mapping application 120 could present a graphical display illustrating the components in the system 100 and connections between those components. The I/O mapping application 120 may also provide a "drill down" into a particular component in the system 100. For instance, the user could select the controller 104a from the graphical user interface, and the user would then be able to view the specific inputs and outputs of the controller 104a. The user may also be able to view how the inputs and outputs of the controller 104a are mapped to inputs and outputs of other components in the system 100. As a specific example, the user may see that the first analog output of the controller 104a is mapped to the second analog input of the controller 104b. The I/O mapping application 120 may further allow the user to poll each controller in the system to verify or validate the source code stored in the memory 208 of the controller.

If the user desires to make changes to either the I/O mappings or the PLC programming in the controller 104a, the user may use the I/O mapping application 120 to change the source code logic of the controller 104a. New source code logic may then be provided to the controller 104a for compilation, or the new source code may be compiled on the user's device and the compiled code may be provided to the controller 104a. Compiled code provided to the controller 104a may be stored at the controller 104a until it is overwritten, which may occur on an individual controller basis or on a system-wide basis. The new source code could also be provided to the controller 104a for storage in the memory 208. These various actions may be logged and time-date stamped, and the I/O mapping application 120 may maintain a time-date stamp history for the various controllers 104a-104n (where the time-date stamp history can be retrieved from any location using appropriate security).

By providing the source code in the memory 208, the source code may be constantly available and can be used for various purposes. For example, each individual processor 206 in the system 100 could be polled for its source code from anywhere in the world, which may allow remote supervision and control of the system 100. It may also allow for efficient standardization among different facilities. By providing the processor 206 in the controller 104a, the processor 206 can perform various tasks without placing a processing burden on the PLC 204. For instance, via the I/O mapping in the controller 104a, the processor 206 may be able to process each individual input and output of the controller 104a locally. As a particular example, because the processor 206 knows which radio and which input or output port is mapped to an input or output of the controller 104a, the processor 206 can process input data locally and then send the results wirelessly to the correct radio(s) and to the correct inputs or outputs. In stand-alone mode, the processor 206 could bypass any SCADA system and the wiring expenses associated with a wired SCADA system.

The following represents specific uses or implementations of the controller 104a and the process control system 100. These examples are for illustration only. Other embodiments or uses of the process control system 100 or the controller 104a could be used without departing from the scope of this disclosure.

In a compost application, a 300-foot long compost pile may have one fan every 50 feet. A controller 104a could use the temperature sensed by a probe (with a known location in the pile) to control an appropriate fan. For example, the fan may be turned on or off in relation to a sensed temperature using a digital output of the controller 104a, or the fan's speed may be adjusted based on the sensed temperature using an analog output of the controller 104a.

In a pharmaceutical application, the U.S. Food and Drug Administration (FDA) often requires "validation" of the elements in a manufacturing process. The ability to offer source code on demand (via the processor 206 retrieving the source code from memory 208) may significantly help in this process. By providing the ability to poll the appropriate PLC 204 for its source ladder logic via the processor 206, a pharmaceutical plant can demonstrate compliance with that portion of the FDA requirement. In particular, by facilitating remote polling of the source code, it may be easier for pharmaceutical companies to monitor their plants for conformity and continuity.

In industrial applications, the ability to use wireless controllers instead of wired controllers may result in significant savings. These savings may translate into the addition of supplemental equipment (such as more controllers) in a facility. The supplemental equipment may allow the facility operator to collect more data regarding a particular process, and that data can be used to develop richer and more robust models of the process. As another example, industrial facilities often include numerous emergency showers, particularly in chemical plants. Unless a shower is physically wired back to an existing SCADA system, the potential for someone needing assistance and not being recognized could literally cost a life. By affixing a trigger mechanism to the shower, the controller 104a could detect when the shower is used and send a message via the network 108 to an emergency response unit or other point, allowing appropriate personnel to be notified via pagers or other mechanisms. As a third example, if valves are used in an industrial facility, the facility operator may need to send someone to physically inspect a valve positioning device to determine if a valve is open, closed, or partially open or closed. With the use of the controller 104a, a valve positioning device can signal the position of a valve on a periodic basis or be polled as needed, and the valve could be opened, closed, or partially opened or closed remotely.

As a particular industrial example, a rupture disk is typically located on a main pipeline at a downstream point after the convergence of three other pipelines (each serviced by its own pump). The purpose of the rupture disk is to "blow" at a pressure point below the allowable maximum vessel pressure of the main pipeline, thereby preventing a pipeline explosion. However, the rupture disk must be replaced once it is blown. By adding a pressure sensor on the main pipeline at the rupture disk location, the system 100 may provide a relatively inexpensive monitoring device on a relatively expensive rupture disk. In this example, the pressure sensor measurements could be input to the controller 104a, and this input could be mapped to multiple outputs of the controller 104a (where the multiple outputs are used to control the three pumps). For instance, an analog output could be used to adjust the operation of one of the pumps, and a digital output could be used to shut off one of the pumps when the measured pressure is approaching the pressure point at which the rupture disk will blow. This may be done for each of the three pumps feeding the main pipeline. In this way, the controller 104a may adjust the operation of the pumps, thereby helping to reduce or eliminate the likelihood that the rupture disk will blow.

This represents only some of the ways in which the controller 104a and the process control system 100 could be used. Other examples could include using the controller 104a to wirelessly detect the opening and closing of security doors or other restricted access doors or windows, to detect the rupture of explosion vents (which are similar to rupture disks), and to detect the opening and closing of remote security gates. The controller 104a could also be used to trigger attached or remote cameras or other recording devices in the event a motion detector or other sensor detects something or an alarm occurs. The controller 104a and the process control system 100 could be used in any other suitable situations or environments, including bypassing existing functions in the PLC 204.

Although FIG. 2 illustrates one example of a wireless controller 104a in a process control system, various changes may be made to FIG. 2. For example, the PLC 204 could reside outside of the controller 104a. In these embodiments, the controller 104a could include connectors for coupling the PLC 204 to the controller 104a. Also, the controller 104a could include any number of analog and digital inputs and outputs (including no analog or digital inputs or outputs), depending on particular needs. Further, the level shifters 210a-210b may not be required, such as when the PLC 204 and the processor 206 operate using the same voltage level, and any other or additional interfaces could be used to facilitate communication between the components of FIG. 2. Beyond that, the controller 104a could be configured to implement various functions in the processor 206 and bypass existing functions in the PLC 204. This may be useful when the PLC 204 used in or with the controller 104a contains some functions that are not needed or desired in the system 100.

In addition, the PLC 204 and the processor 206 could be combined into a single functional unit, such as by incorporating the functionality of the PLC 204 into the processor 206. The processor 206 could then execute the ladder logic of the PLC 204. This may also allow more advanced process control code to be executed by the controller 104a, such as by allowing higher-level or more advanced programming languages to be used in place of ladder logic. Further, the processor 206 could support any suitable number of analog inputs, analog outputs, and digital inputs/outputs. If the processor 206 and the PLC 204 are combined, the resulting component could be referred to or function as a processor and a controller.

FIGS. 3A through 3D illustrate a particular example of a wireless controller 104a in a process control system according to one embodiment of this disclosure. More specifically, FIGS. 3A through 3D illustrate a particular implementation of the embodiment of the controller 104a shown in FIG. 2. The embodiment of the controller 104a shown in FIGS. 3A through 3D is for illustration only. Other embodiments of the controller 104a could be used without departing from the scope of this disclosure.

Figures 2, 3A:
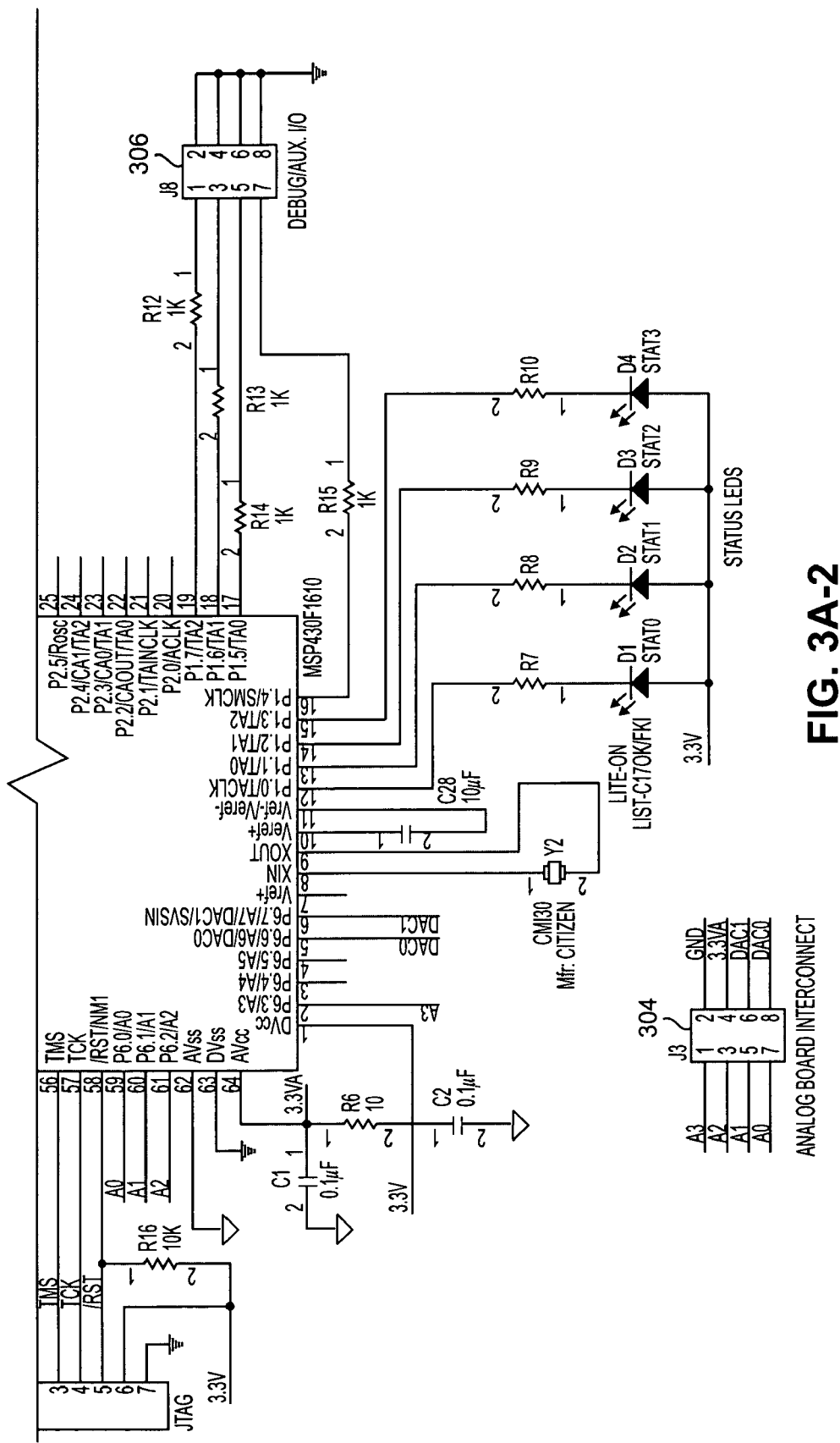
FIGS. 3A through 3D illustrate a particular example of a wireless controller in a process control system according to one embodiment of this disclosure.

In this example as shown in FIG. 3A, the wireless radio 202 is formed from a DM2100 module from RF MONOLITHICS, INC. Also, the processor 206 is formed from a MSP430F1610 microcontroller from TEXAS INSTRUMENTS INC. In addition, the memory 208 is formed from an AT45DBXXXD serial-interface Flash memory device from ATMEL CORPORATION.

In FIG. 3A, the controller 104a also includes a Joint Test Action Group (JTAG) connector 302, which may be used to support the IEEE Standard 1149.1 for controlling and monitoring the pins of the processor 206. The controller 104a further includes analog interconnects 304, which are coupled to the processor 206 and are used to provide analog output signals. In addition, the controller 104a includes a connector 306, which may be used to provide debugging or auxiliary access to the processor 206.

Figures 2, 3B:
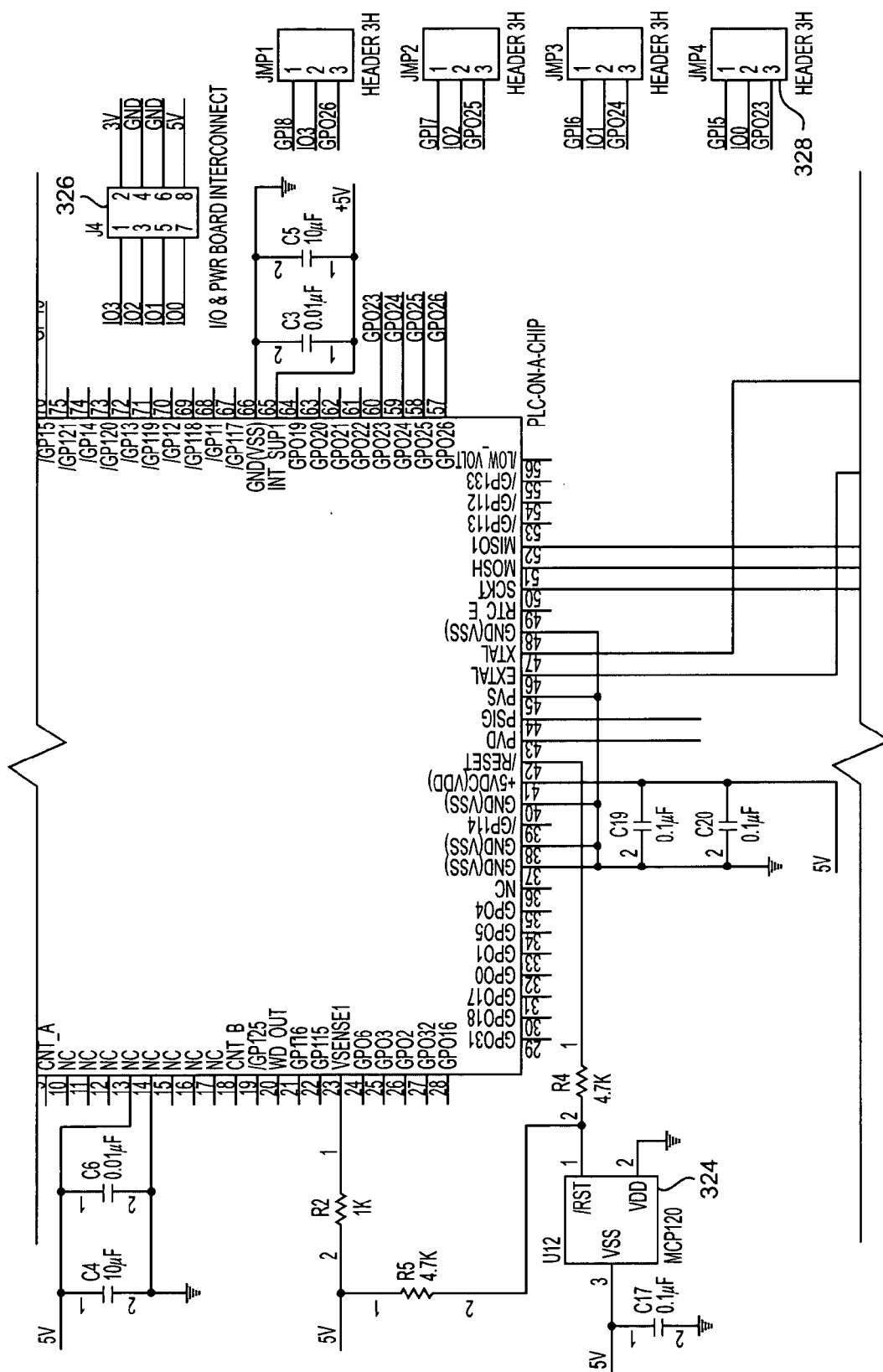
Figures 3, 3B:
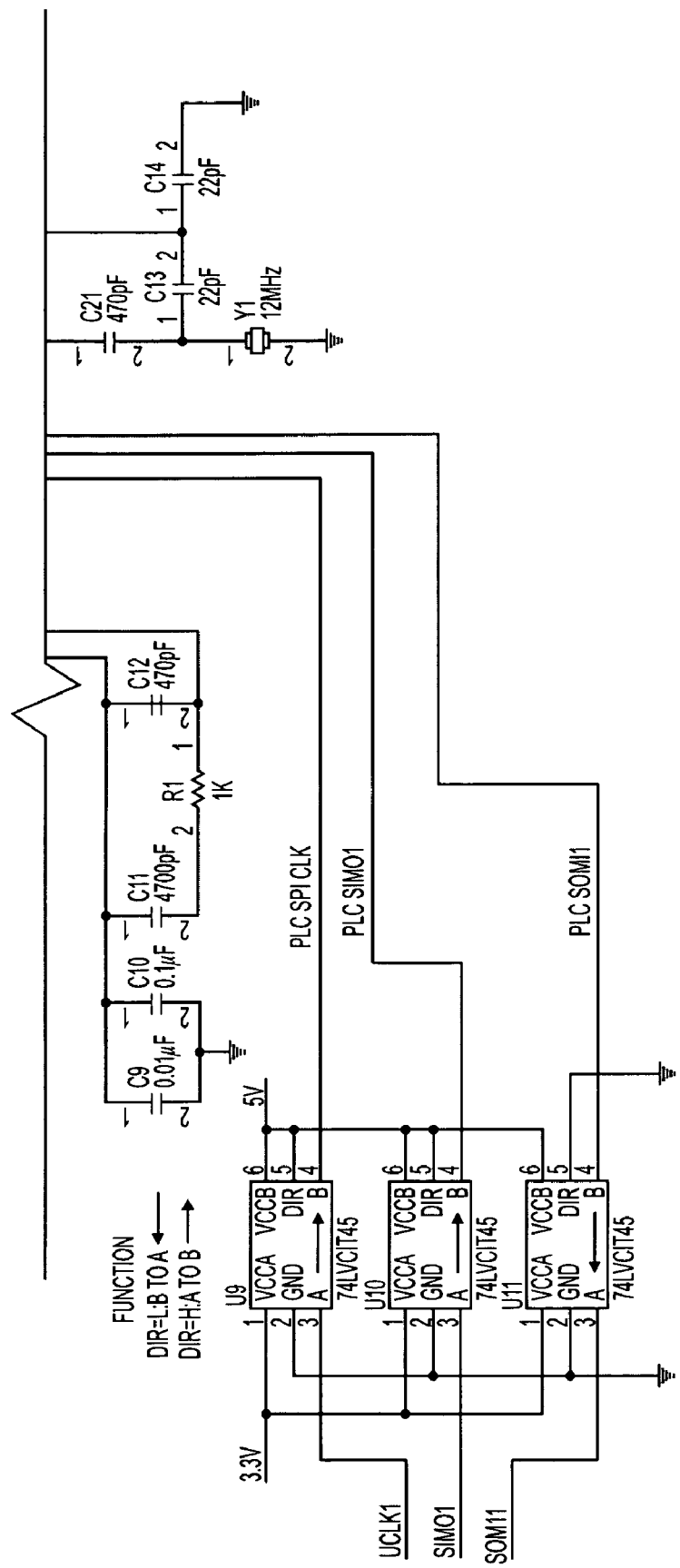

As shown in FIG. 3B, the PLC 204 in the controller 104a is formed from a PLC ON A CHIP from DIVELBISS CORPORATION. Also, the level shifters 210a-210b in the controller 104a are formed from seven bus transceivers 322, which may represent 74LVC1T45 bus transceivers from TEXAS INSTRUMENTS INC.

In FIG. 3B, the controller 104a also includes a voltage supervisory device 324, which protects the PLC 204 by keeping the PLC 204 in a reset state until a system voltage (5V) has reached a proper level and is stable. In this example, the voltage supervisory device 324 is formed from a MCP120 device from MICROCHIP TECHNOLOGY INC. The controller 104a further includes analog or digital interconnects 326, which are coupled to the PLC 204 and are used to receive analog input signals or to receive or provide digital input or output signals. In addition, the controller 104a includes headers 328, which are used to couple other components (such as external components) to the PLC 204.

Figure 3C:
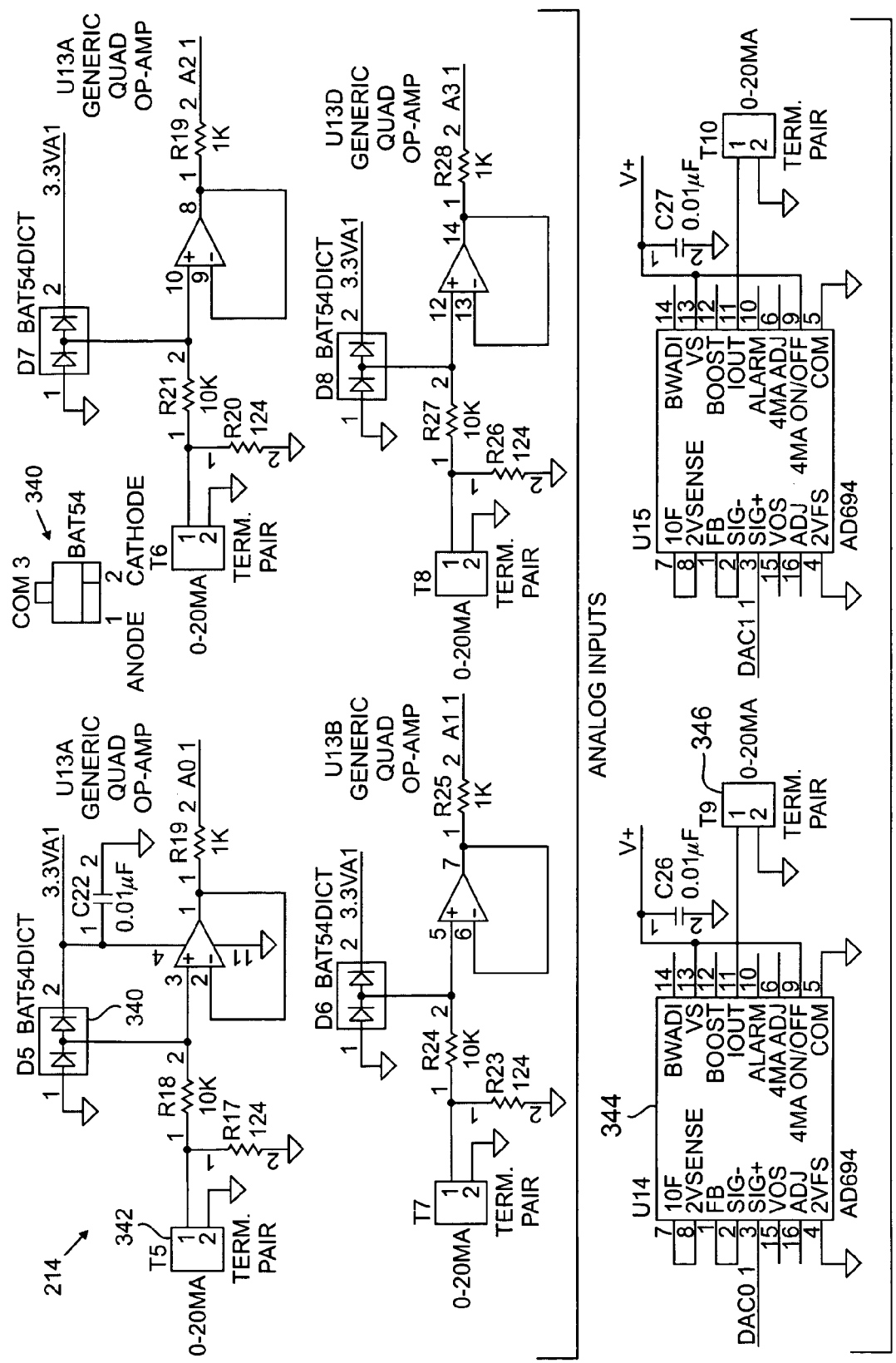

As shown in FIG. 3C, each of the analog inputs 214 may include a barrier diode 340, such as a BAT54DICT from DIODES INCORPORATED. Also, each of the analog inputs 214 is coupled to a two-wire terminal 342, which may receive a 0-20 mA analog signal. Further, as shown in FIG. 3C, each of the analog outputs 212 includes a current transmitter 344 coupled to a two-wire terminal 346, which may output a 0-20 mA analog signal. The current transmitter 344 could represent an AD694 current transmitter from ANALOG DEVICES, INC.

Figure 3D:
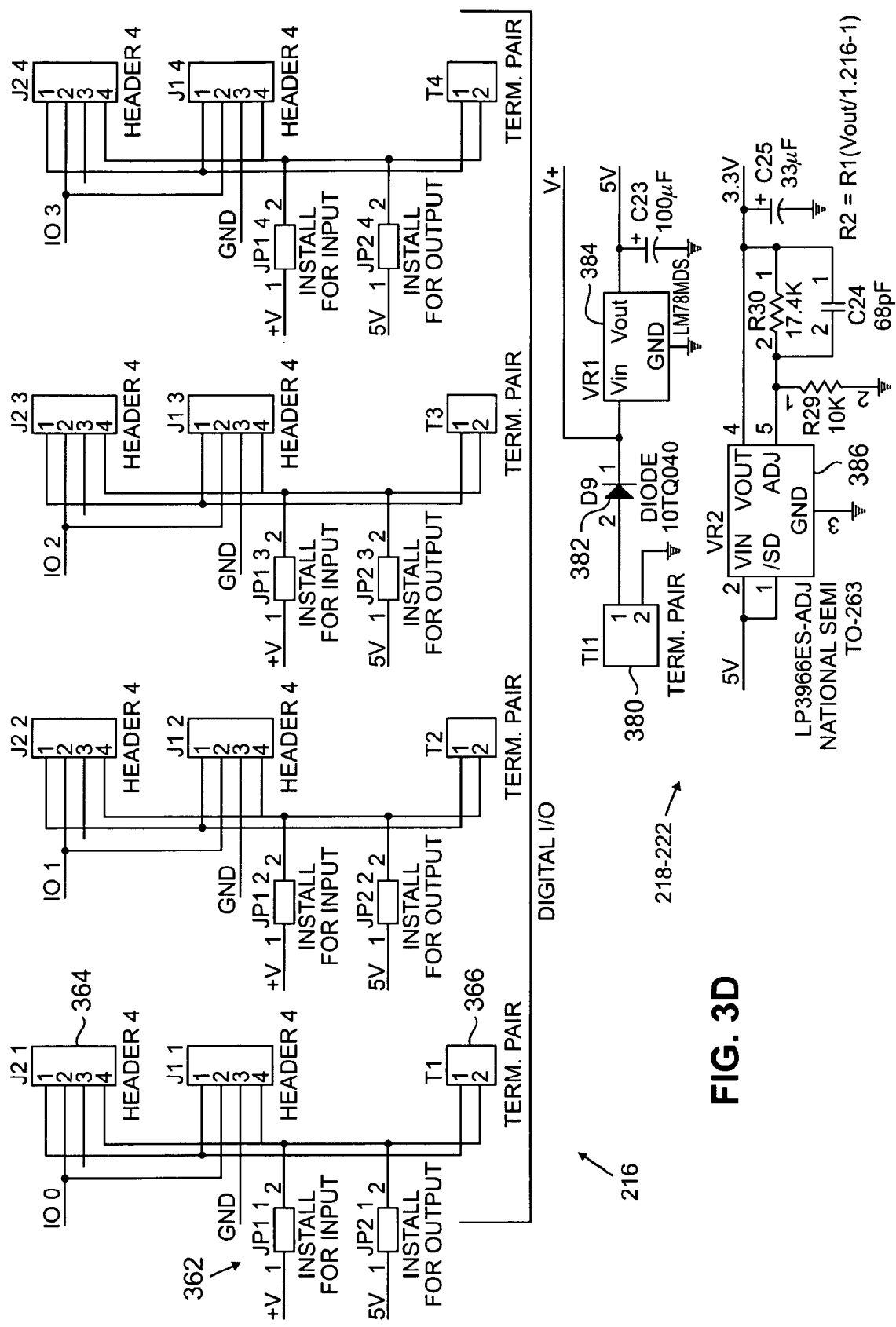

As shown in FIG. 3D, each of the digital inputs/outputs 216 includes one of two jumpers 362, where the installed jumper configures the digital input/output 216 as either an input or an output. Each of the digital inputs/outputs 216 also includes headers 364, which may be used to couple the digital input/output 216 to various signal lines. In addition, each of the digital inputs/outputs 216 includes a two-wire terminal 366, which is used to transmit or receive digital signals.

In addition, as shown in FIG. 3D, the regulated power supplies 218-222 may be coupled to a two-wire terminal 380, which provides power from an external power source. The regulated power supplies 218-222 include a diode 382, a voltage regulator 384, and a linear regulator 386. The voltage regulator 384 produces a 5V signal, and the linear regulator 386 produces a 3.3V signal. The voltage regulator 384 could, for example, be formed from a LM78M05 voltage regulator from NATIONAL SEMICONDUCTOR CORPORATION. The linear regulator 386 could, for example, be formed from a LP3966ES-ADJ regulator (TO-263 package) from NATIONAL SEMICONDUCTOR CORPORATION.

Although FIGS. 3A through 3D illustrate one particular example of a wireless controller 104a in a process control system, various changes may be made to FIGS. 3A through 3D. For example, FIGS. 3A through 3D illustrate particular implementations of various components in the controller 104a. The controller 104a or the components in the controller 104a could have any other suitable arrangement or design according to particular needs.

Figure 4:
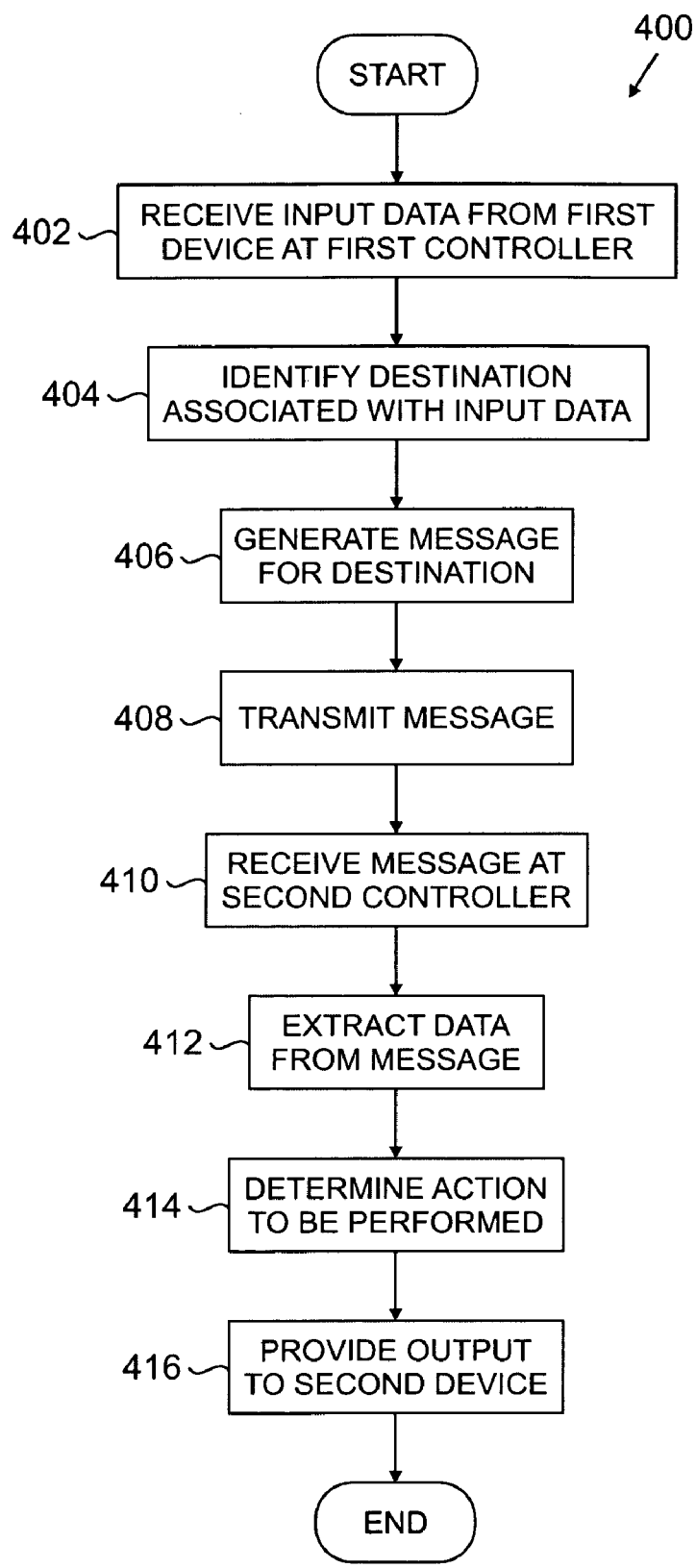
FIG. 4 illustrates an example method for wireless process control according to one embodiment of this disclosure.

FIG. 4 illustrates an example method 400 for wireless process control according to one embodiment of this disclosure. For ease of explanation, the method 400 is described with respect to the controllers 104a-104b (both having the embodiment shown in FIG. 2) operating in the process control system 100 of FIG. 1. The method 400 could be used by any other suitable device(s) and in any other suitable system.

A first controller 104a receives input data from a first device at step 402. This may include, for example, the PLC 204 in the first controller 104a receiving an analog input signal via an analog input 214 or a digital input signal via a digital input/output 216. As a particular example, this may include the PLC 204 receiving pressure measurements from a pressure sensor on a pipeline.

The first controller 104a identifies a destination associated with the input data at step 404. This may include, for example, the processor 206 using mapping information to identify the destination. For instance, the mapping information may associate a particular destination with the analog input 214 or digital input/output 216 through which the input data was received. The destination could represent a radio 202 and an input or output 212-216 in a second controller (in this example, controller 104b).

The controller 104a generates one or more messages for the identified destination at step 406. This may include, for example, the processor 206 packetizing the input data by placing the data into one or more data packets or other data structures. This may also include the processor 206 placing an appropriate address of the destination in the data packets.

The controller 104a transmits the one or more messages at step 408. This may include, for example, the processor 206 providing the one or more messages to the wireless radio 202 for communication over the network 108. The wireless radio 202 could transmit the one or more messages to a particular destination (such as the gateway 110 or another controller). The wireless radio 202 could also generally broadcast the one or more messages within a mesh network.

A second controller 104b receives the one or more transmitted messages at step 410. This may include, for example, the wireless radio 202 in the controller 104b receiving the one more messages directly from the controller 104a or indirectly though other components in the system 100.

The controller 104b extracts data from the one or more received messages at step 412. This may include, for example, the processor 206 in the controller 104b depacketizing the data by removing the data from one or more data packets.

The controller 104b determines an action to be performed using the extracted data at step 414. This may include, for example, the processor 206 determining whether the processor 206 needs to generate an analog output signal to control a specified device. This may also include the PLC 204 in the controller 104b determining whether the PLC 204 needs to generate an analog or digital output signal to control a specified device. As a particular example, this may include the PLC 204 or processor 206 determining whether to modify the operation of a pump based on the pressure measurements from the pressure sensor.

The controller 104b provides an output signal to a second device at step 416. This may include, for example, the processor 206 or the PLC 204 in the controller 104b generating an output signal for implementing the identified action. The processor 206 could generate an analog output signal that is provided to the second device via an analog output 212. The PLC 204 could generate a digital output signal that is provided to the second device via a digital input/output 216. As a particular example, this may include the processor 206 modifying the operation of the pump (by increasing or decreasing the pump speed) or the PLC 204 shutting down the pump.

Although FIG. 4 illustrates one example of a method 400 for wireless process control, various changes may be made to FIG. 4. For example, the action to be performed could be determined by the first controller 104a, which then instructs the second controller 104b of the action to be performed. Also, the controllers could cooperate in any other suitable manner to implement a distributed control scheme in the system 100. Further, a controller (such as controller 104a) could perform steps 402-408 based on one set of input data, and the same controller could perform steps 410-416 in response to receiving different input data from a different controller. In addition, a controller 104a could receive input data and use that input data to control a device coupled to the controller, without needing to transmit data over the network 108. In these embodiments, the controller 104a could be implemented without a wireless radio 202.

Figure 5:
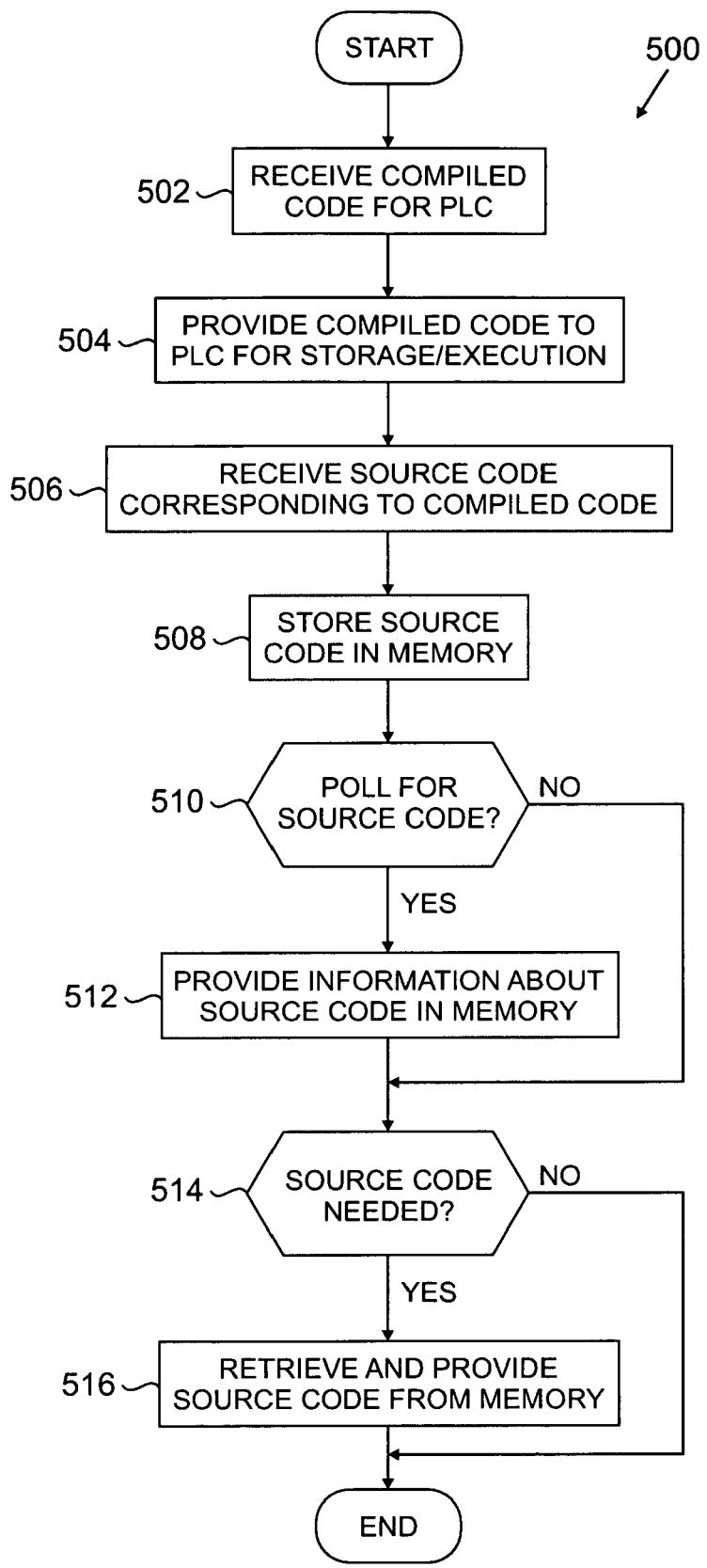
FIG. 5 illustrates an example method for source code management in a wireless controller according to one embodiment of this disclosure.

FIG. 5 illustrates an example method 500 for source code management in a wireless controller according to one embodiment of this disclosure. For ease of explanation, the method 500 is described with respect to the controller 104a of FIG. 2 operating in the process control system 100 of FIG. 1. The method 500 could be used by any other suitable device and in any other suitable system.

The controller 104a receives compiled code for a PLC 204 at step 502. This may include, for example, the wireless radio 202 in the controller 104a receiving messages containing the compiled code from the gateway 110 or other transmitter. This may also include the processor 206 depacketizing the compiled code contained in the received messages. The compiled code could originate from any suitable source, such as the workstation 114.

The controller 104a provides the compiled code to the PLC 204 for storage and execution at step 504. This may include, for example, the processor 206 providing the compiled code to the PLC 204 over a UART interface. The compiled code could be stored in an internal memory of the PLC 204 or in any other suitable memory. The PLC 204 could then execute the compiled code to provide the desired control functionality in the system 100.

The controller 104a receives source code corresponding to the compiled code at step 506. This may include, for example, the wireless radio 202 receiving messages containing the source code from the gateway 110 or other transmitter. This may also include the processor 206 depacketizing the source code contained in the received messages. Again, the source code could originate from any suitable source, such as the workstation 114.

The controller 104a stores the source code in a memory at step 508. This may include, for example, the processor 206 providing the source code to the memory 208 for storage via an SPI interface.

If a poll related to the source code is later received at step 510, the controller 104a provides information about the source code stored in the memory at step 512. This may include, for example, the processor 206 determining that a request to identify the source code in memory 208 has been received. This may also include the processor 206 providing information about the source code in response to the request, such as by identifying the version number of the source code stored in memory 208. In this way, the source code corresponding to the compiled code being executed by the PLC 204 may be easily identified, even from remote access points.

Similarly, if a request for the source code itself is received at step 514, the controller 104a retrieves and provides the source code from the memory at step 516. This may include, for example, the processor 206 retrieving the source code from the memory 208 and generating messages containing the source code. This may also include the processor 206 providing the generated messages to the radio 202 for transmission to the appropriate destination.

Although FIG. 5 illustrates one example of a method 500 for source code management in a wireless controller, various changes may be made to FIG. 5. For example, the steps shown in FIG. 5 could occur in a different order, such as when the source code is received and stored before the compiled code is received. Also, the compiled code could be generated by the controller 104a itself. In addition, the processor 206 could use the source code in any other suitable manner.

Figure 6:
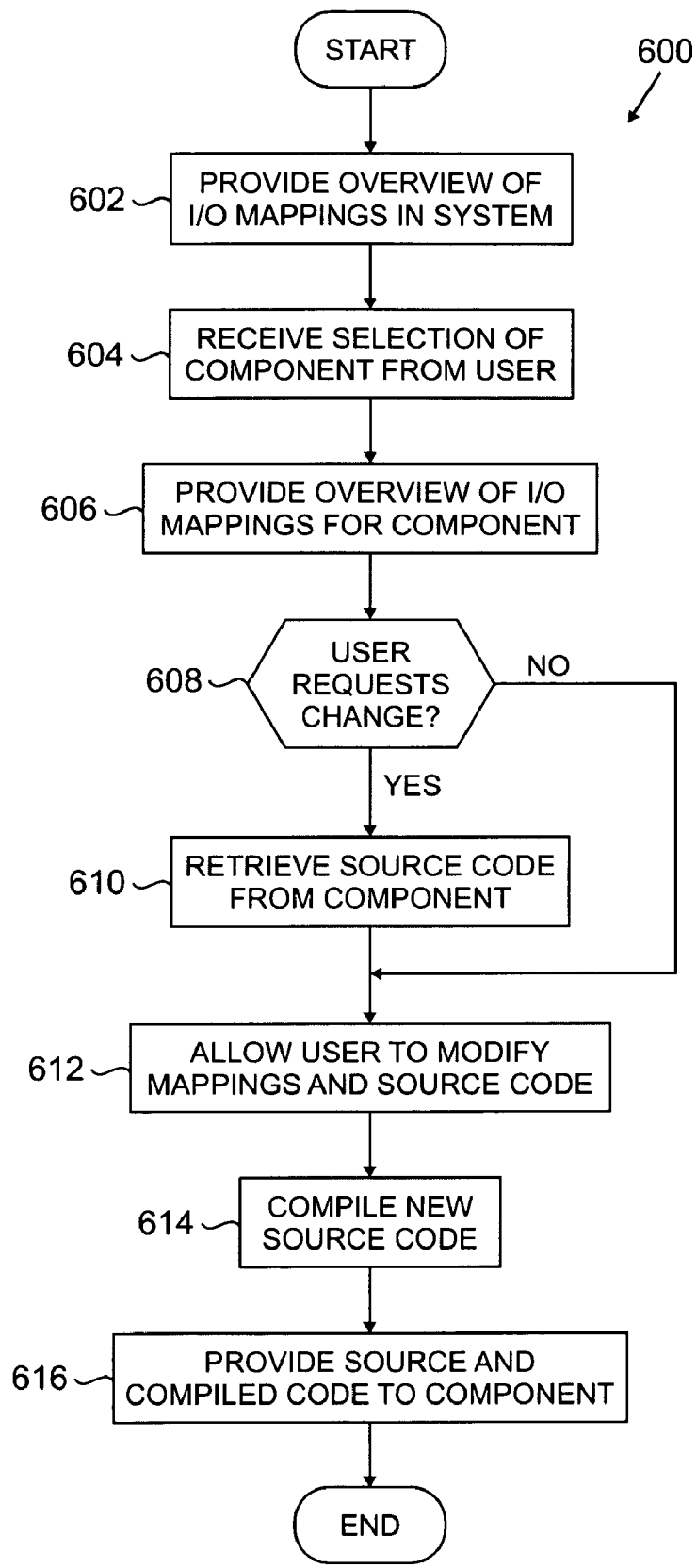
FIG. 6 illustrates an example method for input/output mapping in a wireless process control system according to one embodiment of this disclosure.

FIG. 6 illustrates an example method 600 for input/output mapping in a wireless process control system according to one embodiment of this disclosure. For ease of explanation, the method 600 is described with respect to the I/O mapping application 120 executing on the workstation 114 in the process control system 100 of FIG. 1. The method 600 could be used by any other suitable device and in any other suitable system.

The I/O mapping application 120 provides an overview of the I/O mappings in a process control system at step 602. This may include, for example, the I/O mapping application 120 generating a graphical user interface that identifies the different components in the system 100. The graphical user interface could also graphically link any two components that are associated by an I/O mapping. As a particular example, the identified components could include all or a subset of the controllers 104a-104n in the process control system 100, and a line could connect any two controllers having inputs and/or outputs that are mapped to one another. The information used to generate the overview could be retrieved in any suitable manner, such as by using locally stored information or information retrieved from the controllers 104a-104n.

The I/O mapping application 120 receives a selection of a particular component in the process control system from a user at step 604. This may include, for example, the user using a mouse or other input device to select one of the controllers 104a-104n identified in the graphical user interface.

The I/O mapping application 120 provides an overview of the I/O mappings for the selected component at step 606. This may include, for example, the I/O mapping application 120 presenting an image representing a selected controller, where the image identifies all of the inputs and outputs 212-216 of that controller. For each input or output involved in an I/O mapping, the graphical user interface could also provide information about the mapping (such as information identifying the radio 202 and the input or output 212-216 in another controller).

If the user requests a change to the operation of the selected component at step 608, the I/O mapping application 120 retrieves the source code from the selected component at step 610. The user is then allowed to modify the mappings or the source code at step 612. This may include, for example, the user adding, altering, or deleting I/O mappings associated with the selected controller. This may also include the user altering the ladder logic in the source code, where the ladder logic is executed by the PLC 204 in the selected controller.

The I/O mapping application 120 compiles the new source code into compiled code at step 614, and the new source and compiled code is provided to the selected component at step 616. This may include, for example, the workstation 114 communicating the source and compiled code to the selected controller over the network 108 via the gateway 110. In this way, the I/O mapping application 120 allows the user to easily view and modify the operation of the controllers 104a-104n in the system 100.

Although FIG. 6 illustrates one example of a method 600 for input/output mapping in a wireless process control system, various changes may be made to FIG. 6. For example, source code in a controller could be modified in any other suitable manner, and the I/O mapping application 120 need not be used.

In some embodiments, various functions performed within or in conjunction with the system 100 (such as by the controllers or the I/O mapping application) are implemented or supported by one or more computer programs each formed from computer readable program code and embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases that have been used within this patent document. The term "couple" and its derivatives refer to any direct or indirect communication between two or more elements, whether or not those elements are in physical contact with one another. The term "application" refers to one or more computer programs, sets of instructions, procedures, functions, objects, classes, instances, or related data adapted for implementation in a suitable computer language. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, software, firmware, or combination thereof. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for wireless process control, comprising:
a programmable logic controller capable of at least one of: receiving first input data from at least one device in a process control system and providing output data to the at least one device in the process control system, the programmable logic controller also capable of executing compiled code, the process control system associated with a process;
a wireless radio capable of communicating over a wireless network;
a memory capable of storing source code corresponding to the compiled code; and
a processor capable of receiving second input data associated with the process and providing the second input data to the wireless radio for transmission over the wireless network without placing a processing burden on the programmable logic controller;
wherein the second input data is received by the wireless radio over the wireless network, and the processor is capable of providing the second input data to the wireless radio for transmission to provide a repeater function in the wireless network.

2. The apparatus of claim 1, wherein the processor is further capable of:
retrieving the source code from the memory; and
providing the source code to the wireless radio for transmission over the wireless network.

3. The apparatus of claim 1, wherein the processor is further capable of:
receiving a poll for information about the source code stored in the memory; and
providing the information to the wireless radio for transmission over the wireless network.

4. The apparatus of claim 1, wherein the processor is further capable of:
identifying a destination associated with the first input data using a mapping, the mapping associated with an input used to receive the first input data; and
providing the first input data to the wireless radio for transmission to the destination via the wireless network.

5. The apparatus of claim 1, wherein the processor is further capable of:
receiving third input data from the wireless radio, the third input data received over the wireless network; and
at least one of:
providing the third input data to the programmable logic controller, the programmable logic controller capable of generating the output data based on the third input data, the output data for controlling one or more of the at least one device; and
generating second output data based on the third input data, the second output data for controlling one or more of the at least one device.

6. The apparatus of claim 1 wherein the wireless radio comprises a wireless peer-to-peer, multipoint-to-multipoint radio capable of communicating over a wireless mesh network.

7. The apparatus of claim 1, wherein the programmable logic controller and the processor form a single functional unit.

8. The apparatus of claim 1, wherein:
the processor is coupled to a plurality of analog outputs and is capable of generating a plurality of analog output signals;
the programmable logic controller is coupled to a plurality of analog inputs and is capable of receiving a plurality of analog input signals; and
the programmable logic controller is coupled to a plurality of digital inputs/outputs and is capable of at least one of: generating one or more digital output signals and receiving one or more digital input signals.

9. The apparatus of claim 1, wherein the at least one device in the process control system comprises one or more of:
a sensor capable of measuring one or more characteristics in the process control system;
an actuator capable of initiating one or more physical actions in the process control system; and
a processing element capable of performing one or more physical actions in the process control system.

10. The apparatus of claim 1, wherein:
the programmable logic controller comprises a single chip;
the memory comprises a Flash memory; and
the processor comprises a microcontroller.

11. A method for wireless process control, comprising:
executing compiled code at a programmable logic controller, the programmable logic controller forming part of or associated with a first controller in a process control system, the process control system associated with a process being controlled;
storing source code corresponding to the compiled code in a memory of the first controller; and
receiving input data associated with the process at a processor in the first controller and wirelessly communicating the input data to a second controller over a wireless network without placing a processing burden on the programmable logic controller, the controllers capable of controlling at least one device in the process control system;
wherein the input data is received over the wireless network and is wirelessly communicated to the second controller to provide a repeater function in the wireless network.

12. The method of claim 11, wherein storing the source code comprises providing the source code to processor in the first controller, the processor capable of storing the source code in the memory.

13. The method of claim 11, further comprising:
retrieving the source code from the memory; and
wirelessly communicating the source code over the wireless network.

14. The method of claim 11, further comprising:
receiving a poll for information about the source code stored in the memory; and
wirelessly communicating the information over the wireless network.

15. The method of claim 11, further comprising:
receiving second input data through an input of the first controller;
identifying a destination associated with the second input data using a mapping, the mapping associated with the input of the first controller and a radio and an input or output of the second controller; and
addressing data packets containing the second input data with an address associated with the identified destination.

16. The method of claim 11, further comprising:
receiving second input data from the second controller; and
generating output data based on the second input data, the output data for controlling one or more of the at least one device.

17. The method of claim 11, wherein wirelessly communicating the input data comprises using a wireless peer-to-peer, multipoint-to-multipoint radio capable of communicating over a wireless mesh network.

18. The method of claim 11, wherein the at least one device in the process control system comprises one or more of:
a sensor capable of measuring one or more characteristics in the process control system;
an actuator capable of initiating one or more physical actions in the process control system; and
a processing element capable of performing one or more physical actions in the process control system.

19. The method of claim 11, wherein the programmable logic controller forms part of the processor in the first controller.

20. A system for wireless process control, comprising:
a plurality of devices associated with a process and capable of one or more of: measuring one or more characteristics in the system, initiating one or more physical actions in the system, and performing one or more physical actions in the system; and
a plurality of controllers coupled to the plurality of devices, each of at least one of the controllers comprising:
a programmable logic controller capable of at least one of: receiving input data from at least one of the devices and providing output data to at least one of the devices, the programmable logic controller also capable of executing compiled code;
a memory capable of storing source code corresponding to the compiled code;
a wireless radio capable of communicating with at least one other of the controllers over a wireless network; and
a processor capable of receiving second input data associated with the process and providing the second input data to the wireless radio for transmission to at least one other of the controllers over the wireless network without placing a processing burden on the programmable logic controller;
wherein the second input data is received over the wireless network and the processor is capable of providing the second input data to the wireless radio for transmission to provide a repeater function in the wireless network.

21. The system of claim 20, further comprising a workstation capable of at least one of:
polling one or more of the controllers to identify the source code stored in the memory of the one or more controllers; and
retrieving the source code stored in the memory of one or more of the controllers.

22. The system of claim 21, wherein the workstation is further capable of:
allowing a user to alter mappings between inputs and outputs of the controllers.

23. An apparatus, comprising:
a processor capable of communicating with an external programmable logic controller, the programmable logic controller capable of at least one of: receiving input data from at least one device in a process control system and providing output data to the at least one device in the process control system, the programmable logic controller also capable of executing compiled code, the process control system associated with a process being controlled;
a wireless radio capable of communicating over a wireless network; and
a memory capable of storing source code corresponding to the compiled code;
wherein the processor is further capable of receiving second input data associated with the process and providing the second input data to the wireless radio for transmission over the wireless network without placing a processing burden on the programmable logic controller; and
wherein the second input data is received over the wireless network and the processor is capable of providing the second input data to the wireless radio for transmission to provide a repeater function in the wireless network.

* * * * *

UNITED STATES PATENT AND TRADEMARK OFFICE
CERTIFICATE OF CORRECTION

PATENT NO. : 7,424,328 B2
APPLICATION NO. : 11/327828
DATED : September 9, 2008
INVENTOR(S) : Louis F. De Silvio It is certified that error appears in the above-identified patent and that said Letters Patent is hereby corrected as shown below:

Column 17, claim 12, line 24, insert --the-- before the term "processor".

Signed and Sealed this

Eighth Day of December, 2009

David J. Kappos
*Director of the United States Patent and Trademark Office*